(12) United States Patent
Drzymak et al.

(10) Patent No.: US 6,722,566 B1
(45) Date of Patent: Apr. 20, 2004

(54) ELECTRO-OPTICAL SCAN MODULE USING SELECTABLE MIRRORS

(75) Inventors: Mark Drzymak, Commack, NY (US);
Paul Dvorkis, East Setauket, NY (US);
Yuri Gofman, Bohemia, NY (US);
Henry Grossfeld, Great Neck, NY (US);
Timothy Healey, Ithaca, NY (US);
Howard Shepard, Great River, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 10/289,960

(22) Filed: Nov. 7, 2002

(51) Int. Cl.⁷ .................................................. G06K 7/14
(52) U.S. Cl. ................ 235/454; 235/462.4; 235/472.01
(58) Field of Search ............................. 235/454, 462.01, 235/462.36, 462.4, 462.45, 472.01

(56) References Cited

U.S. PATENT DOCUMENTS

| | | | | |
|---|---|---|---|---|
| 5,373,148 A | * | 12/1994 | Dvorkis et al. | 235/472.01 |
| 5,579,148 A | * | 11/1996 | Nishikawa et al. | 235/472.01 |
| 5,629,510 A | * | 5/1997 | Quinn et al. | 235/462.36 |
| 6,149,061 A | * | 11/2000 | Massieu et al. | 235/462.36 |
| 6,527,184 B1 | * | 3/2003 | Oliva | 235/462.36 |

\* cited by examiner

*Primary Examiner*—Daniel St.Cyr
(74) *Attorney, Agent, or Firm*—Kirschstein, et al.

(57) ABSTRACT

Mirrors having different optical properties are selected to change the cross-section of a beam electro-optical reader for reading bar code symbols.

14 Claims, 5 Drawing Sheets

ELECTRO-OPTICAL SCAN MODULE USING SELECTABLE MIRRORS

BACKGROUND OF THE INVENTION

1. Field of the Invention

The present invention generally relates to electro-optical systems, such as bar code symbol readers, and more particularly to a compact scan module for use in applications requiring at least two different laser beam characteristics.

2. Description of the Related Art

One-dimensional bar code symbols are formed from bars typically rectangular in shape with a variety of possible widths and spaced apart by spaces of various widths. The specific arrangement of the bars and spaces defines the characters represented by the symbol according to a set of rules and definitions specified by the code or "symbology" used. The relative size of the bars and spaces is determined by the type of coding used as is the actual size of the bars and spaces. The number of characters (represented by the bar code symbol) per unit length is referred to as the density of the symbol. To encode the desired sequence of the characters, a collection of bar and space arrangements are concatenated together to form the complete bar code symbol, with each character of the message being represented by its own corresponding group of bars and spaces. In some symbologies, a unique "start" and "stop" character is used to indicate when the bar code begins and ends. A number of different bar code symbologies is in widespread use including UPC/EAN, Code 39, Code 128, Codabar, and Interleaved 2 of 5.

In order to increase the amount of data that can be represented or stored on a given amount of surface area, several more compact bar code symbologies have been developed. One of these code standards, Code 49, exemplifies a "two-dimensional" symbol by reducing the vertical height of a one-dimensional symbol, and then stacking distinct rows of such one-dimensional symbols, so that information is encoded both vertically as well as horizontally. That is, in Code 49, there are several rows of bar and space patterns, instead of only one row as in a "one-dimensional" symbol. The structure of Code 49 is described in U.S. Pat. No. 4,794,239. Another two-dimensional symbology, known as "PDF417", is described in U.S. Pat. No. 5,304,786.

Still other symbologies have been developed in which the symbol is comprised not of stacked rows, but of a matrix array made up of hexagonal, square, polygonal and/or other geometric shapes, lines, or dots. Such symbols are described in, for example, U.S. Pat. Nos. 5,276,315 and 4,794,239. Such matrix code symbologies may include Vericode, Datacode, and MAXICODE.

Various optical scanning systems and readers have been developed heretofore for reading indicia such as bar code symbols appearing on a label or on the surface of an article. The readers function by electro-optically transforming the spatial pattern represented by the graphic indicia into a time-varying electrical signal, which is in turn decoded into data which represent the information or characters encoded in the indicia that are intended to be descriptive of the article or some characteristic thereof. Such data is typically represented in digital form and utilized as an input to a data processing system for applications in point-of-sale processing, inventory control distribution, transportation and logistics, and the like.

One particularly advantageous type of reader is an optical scanner which scans a beam of light, such as a laser beam, across the symbols. Laser scanner systems and components have generally been designed to read indicia having parts of different light reflectivity, i.e., bar code symbols, particularly of the Universal Product Code (UPC) type, at a certain working range or reading distance from a hand-held or stationary scanner to the symbol or target.

In the laser beam scanning systems known in the art, a laser light beam from a light source is directed by a lens or other optical components along a light path toward a target that includes a bar code symbol on a target surface. The moving-beam scanner operates by repetitively scanning the light beam in a scan line or a series of scan lines across the symbol by means of motion of a scanning component, such as the light source itself or a mirror disposed in the path of the light beam. The scanning component may either sweep a beam spot across the symbol and trace the scan line or scan lines across the symbol, or scan the field of view of a sensor of the scanner, or do both. The laser beam may be moved by optical or opto-mechanical means to produce a scanning light beam. Such action may be performed by either deflecting the beam (such as by a moving optical element, such as a mirror) or moving the light source itself. U.S. Pat. No. 5,486,944 describes a scan module in which a mirror is mounted on a flex element for reciprocal oscillation by electromagnetic actuation. U.S. Pat. No. 5,144,120 to Krichever, et al. describes laser, optical and sensor components mounted on a drive for repetitive reciprocating motion either about an axis or in a plane to effect scanning of the laser beam.

Another type of bar code scanner employs electronic means for causing the light beam to be deflected and thereby scan the bar code symbol, rather than using a mechanical motion to move or deflect the beam. For example, a linear array of closely spaced light sources activated one at a time in a regular sequence may be transmitted to the bar code symbol to simulate a scanned beam from a single source. Instead of a single linear array of light sources, a multiple-line array of individual lasers may also be employed, thereby producing multiple scan lines. Such a bar code reader is disclosed in U.S. Pat. No. 5,258,605 to Metlitsky, et al. The use of multiple discrete lasers is also described in U.S. Pat. No. 5,717,221.

Bar code reading systems also include a sensor or photodetector which detects light reflected or scattered from the symbol. The photodetector or sensor is positioned in the scanner in an optical path so that it has a field of view which ensures the capture of a portion of the light which is reflected or scattered off the symbol, detected, and converted into an electrical signal.

In retroreflective light collection, a single optical component, e.g., a reciprocally oscillatory mirror, such as described by Krichever, et al. in U.S. Pat. No. 4,816,661 or by Shepard, et al. in U.S. Pat. No. 4,409,470, both herein incorporated by reference, and U.S. Pat. No. 6,114,712, scans the beam across a target surface and directs the collected light to a detector. The mirror surface usually is relatively large to receive as much incoming light as is possible. Only a small detector is required since the mirror can focus the light onto a small detector surface, which increases signal-to-noise ratio.

A variety of mirror and motor configurations can be used to move the beam in a desired scanning pattern. For example, U.S. Pat. No. 4,251,798 discloses a rotating polygon having a planar mirror at each side, each mirror tracing a scan line across the symbol. U.S. Pat. Nos. 4,387,297 and 4,409,470 both employ a planar mirror which is repetitively and reciprocally driven in alternate circumferential directions about a drive shaft on which the mirror is mounted. U.S. Pat. No. 4,816,660 discloses a multi-mirror construction composed of a generally concave mirror portion and a generally planar mirror portion. The multi-mirror construction is repetitively reciprocally driven in alternate circumferential directions about a drive shaft on which the multi-mirror construction is mounted. U.S. Pat. No. 6,247,647 describes an arrangement for providing either a multiple line, or a single line, scan pattern by means of a controller. All of the above-mentioned U.S. patents are incorporated herein by reference.

In electro-optical scanners of the type discussed above, the implementation of the laser source, the optics, the mirror structure, the drive to oscillate the mirror structure, the photodetector, and the associated signal processing and decoding circuitry as individual components all add size and weight to the scanner. In applications involving protracted use, a large, heavy scanner can produce user fatigue. When use of the scanner produces fatigue or is in some other way inconvenient, the user is reluctant to operate the scanner. Any reluctance to consistently use the scanner defeats the data gathering purposes for which such bar code systems are intended. Thus, a need exists for a compact module to fit into small compact devices, such as electronic notebooks, portable digital assistants, pagers, cell phones, and other pocket appliances, which can serve multiple scanning applications.

Thus, an ongoing objective of bar code reader development is to miniaturize the reader as much as possible, and a need still exists to further reduce the size and weight of the scan module or engine and to provide a particularly convenient to use scanner. The mass of the moving components should be as low as possible to minimize the power required to produce the scanning movement, thereby saving battery power.

It is further desirable to modularize the scan engine so that a single module can be used in a variety of different scanning applications, such as a near field or far field reader, or reading one-dimensional or two-dimensional symbols with a single or multiple scan line pattern. A need exists to develop a particularly compact, lightweight scan module for different applications.

SUMMARY OF THE INVENTION

OBJECTS OF THE INVENTION

Accordingly, it is an object of the present invention to provide a scan module with selectable scan mirrors having different optical properties for use in a bar code reader.

A related object is to develop an electro-optical, compact scan module which enables the laser beam to be optically modified and customized for a particular application.

FEATURES OF THE INVENTION

In keeping with these objects and others which will become apparent hereinafter, one feature of this invention resides, briefly stated, in an arrangement for scanning indicia in a system for electro-optically reading the indicia. The arrangement includes a support, a hub mounted on the support for turning movement about an axis, a plurality of optical elements mounted on the hub for joint movement therewith, and a drive for moving the elements. The hub, the elements, the drive and the support together constitute a compact scan module or engine for ready replacement in the system.

The elements are preferably scan mirrors having different optical characteristics. For example, one mirror may have a flat surface, and another mirror may have a convex surface. A laser beam having a generally circular cross-section will reflect off a flat mirror with the same circular cross-section, but will reflect off a convex mirror with an elliptical cross-section. The circular cross-section is better for reading two-dimensional symbols, whereas the elliptical cross-section is better for reading one-dimensional symbols. The mirrors direct the beam incident thereon as an optically modified beam along an optical path toward the indicia to be read.

The drive selectively positions one of the mirrors at a reference position in the optical path and, once so positioned, the drive oscillates the positioned mirror about the axis. Preferably, the reference position is a central position, and the oscillation is back-and-forth in opposite directions relative to the central position of a respective scan line on and across the indicia.

In the preferred embodiment, the drive includes a permanent magnet on the hub, a first electromagnetic coil which, when energized, generates a first magnetic field that interacts with the permanent field of the magnet to turn the magnet and the hub, and a second electromagnetic coil which, when energized, generates a second magnetic field that interacts with the permanent field to turn the magnet and the hub. The coils are angularly spaced apart about the axis and are selectively energized. Each coil is energized by a periodic, alternating drive signal so that the hub oscillates.

The drive also includes a first pole piece for the first coil, and a second pole piece for the second coil. Each pole piece is constituted of a ferromagnetic material and, by interaction with the magnet, defines a respective reference position or starting point relative to which the hub oscillates.

By selecting one mirror, the light incident thereon is swept across the indicia with a certain optical characteristic, for example, a beam spot of a certain cross-section as described above. By selecting another mirror, a beam spot of a different cross-section is swept across the indicia. Selection of the beam spot can be performed manually or automatically. The different properties of the beam spot can be employed to read one-dimensional or two-dimensional symbols, or to preferentially read close-in or far-out symbols, or to read symbols of different densities.

The scan module can be used by itself in a reader to obtain scanning in one direction across a symbol, either across the length or width of the symbol. The scan module can be used with another scan module to obtain scanning in mutually orthogonal directions across the symbol. It is currently preferred when the scan module of this invention is used to sweep a laser beam over relatively small arc lengths on the order of ±3° degrees mechanical.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

As used in this specification and in the appended claims, the term "indicia" broadly encompasses not only symbol patterns composed of alternating bars and spaces of various widths commonly referred to as bar code symbols, but also other one- or two-dimensional graphic patterns, as well as alphanumeric characters. In general, the term "indicia" may apply to a type of pattern or information which may be recognized or identified by scanning a light beam and by detecting reflected or scattered light as a representation of variations in light reflectivity at various points of the pattern or information. A bar code symbol is one example of an "indicia" which the present invention can scan.

Figure 1:
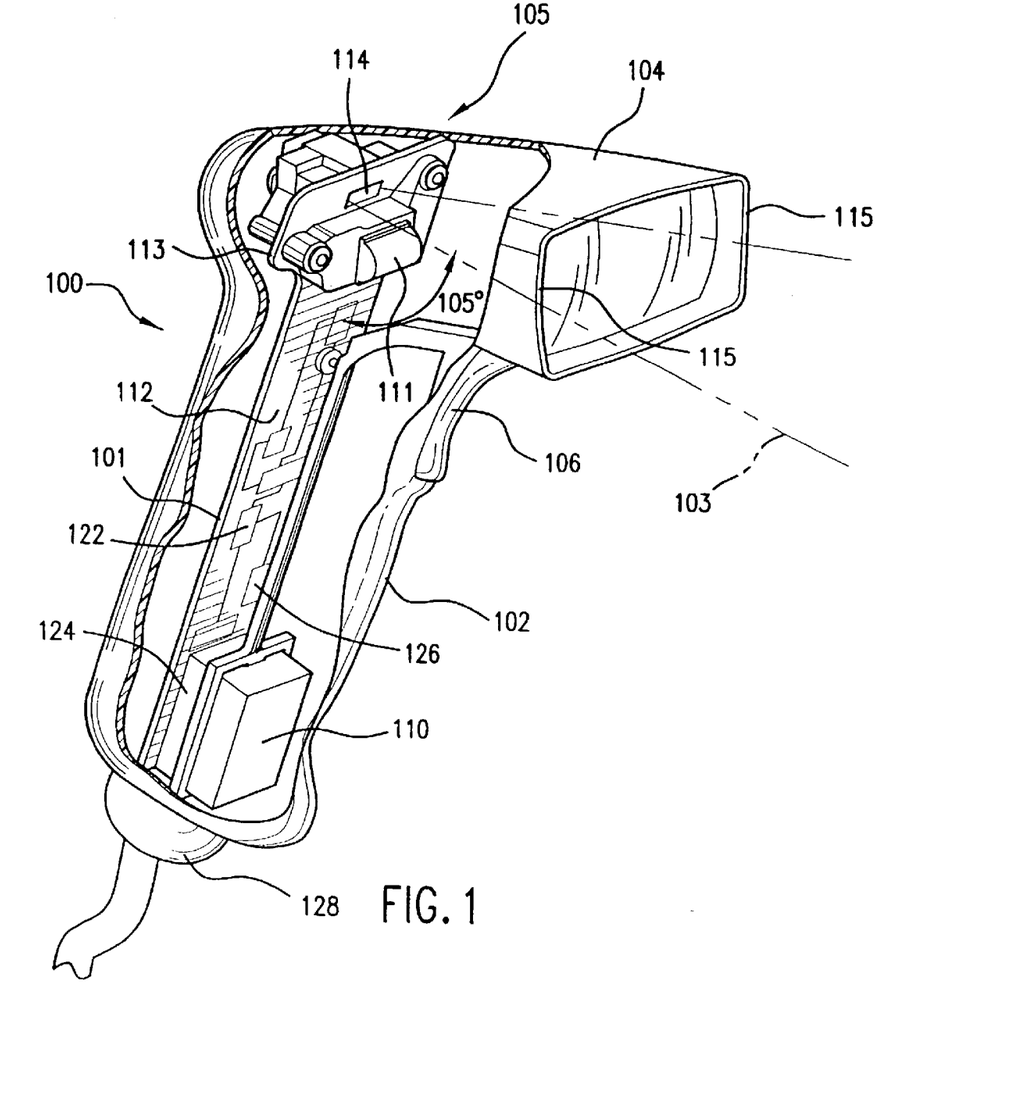
FIG. 1 is a cut-away, perspective view of a triggered handheld bar code reader in which a scan module, according to the present invention, is mountable.

As a preferred embodiment, we describe the implementation of the present invention in a laser-scanning, bar code reading unit similar to the band-held reader illustrated in FIG. 1. The device of FIG. 1 is generally of the style disclosed in U.S. Pat. No. 6,186,400 assigned to Symbol Technologies, Inc. and hereby incorporated by reference, and also similar to the configuration of a bar code reader commercially available as part number LS 4000 or LS 1900 from Symbol Technologies, Inc. of Holtsville, New York. Alternatively, or in addition, features of U.S. Pat. Nos. 4,387,297 and 4,760,248 issued to Swartz, et al., or U.S. Pat. No. 4,409,470 issued to Shepard, et al., both such patents being assigned to Symbol Technologies, Inc., may be employed in constructing the bar code reader unit of FIG. 1. These U.S. Pat. Nos. 4,760,248, 4,387,297 and 4,409,470 are incorporated herein by reference.

FIG. 1 shows the overall layout and design of a reader 100. There is a single printed circuit board (PCB) 101 that slides into a housing handle 102 in a generally vertical or upright fashion. The PCB is oriented at a 105° angle relative to a horizontal scan plane. The housing is shown in a cut-away view. The housing consists of the handle 102 and a barrel or canopy 104 molded in a fashion similar to that known in the art. The PCB supports a scan module or engine 105, a trigger switch 106, and related electronics 122 connected to a controller 124. The scan engine is a non-retro system with a light collection assembly 120 on a front side 112 of the PCB and a scanning assembly 300 on a rear side 113 of the PCB. This allows the laser beam scanning field to be closely matched with the collection field. An outgoing laser beam passes through a slot 114 in the PCB and is clipped by the exit window edges 115 of the housing so it is usable almost to the end of the scan line.

Figure 2:
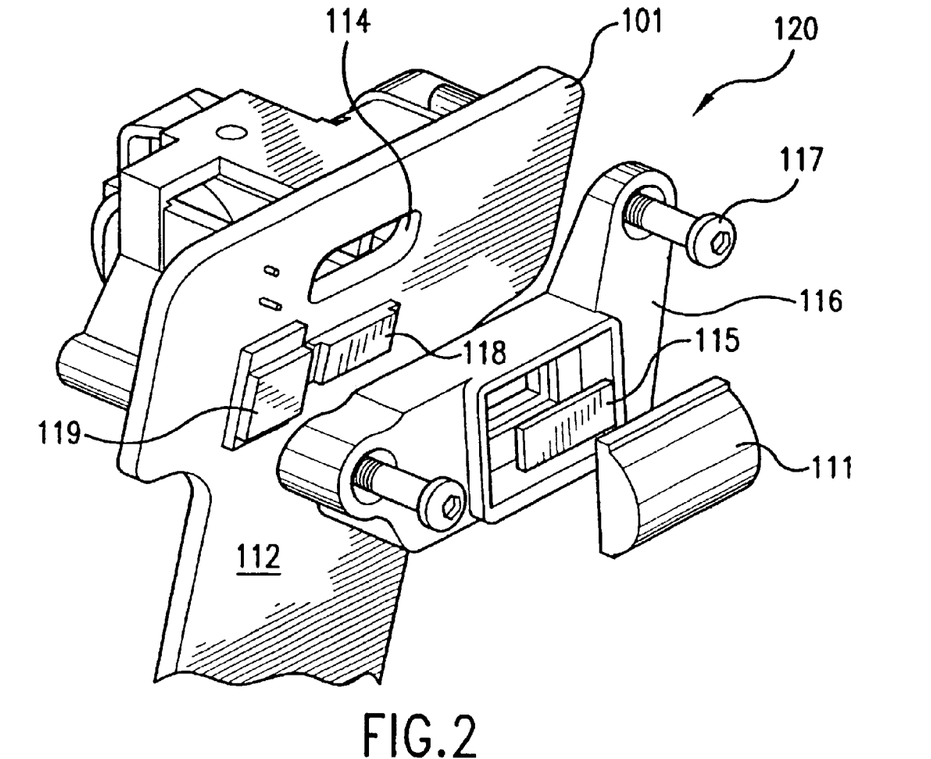
FIG. 2 is an enlarged, broken-away, exploded view of the light collection assembly of the reader of FIG. 1.

FIG. 2 shows an exploded view of the collection assembly 120. Shown from right to left are a cylindrical collection lens 111, an optical filter 115, a molded plastic chassis 116, and mounting screws 117. Shown on the front side 112 of the PCB are a photodetector 118 and an amplifier 119 which will be enclosed by the chassis 116. The chassis 116 will be coated with nickel (or some similar material) to provide electrical shielding of the photodetector and amplifier. There will be another part (not shown) that will provide electrical isolation between the screws that connect the collection chassis 116 to the scan assembly 300 (through the PCB) described below.

Figure 3:
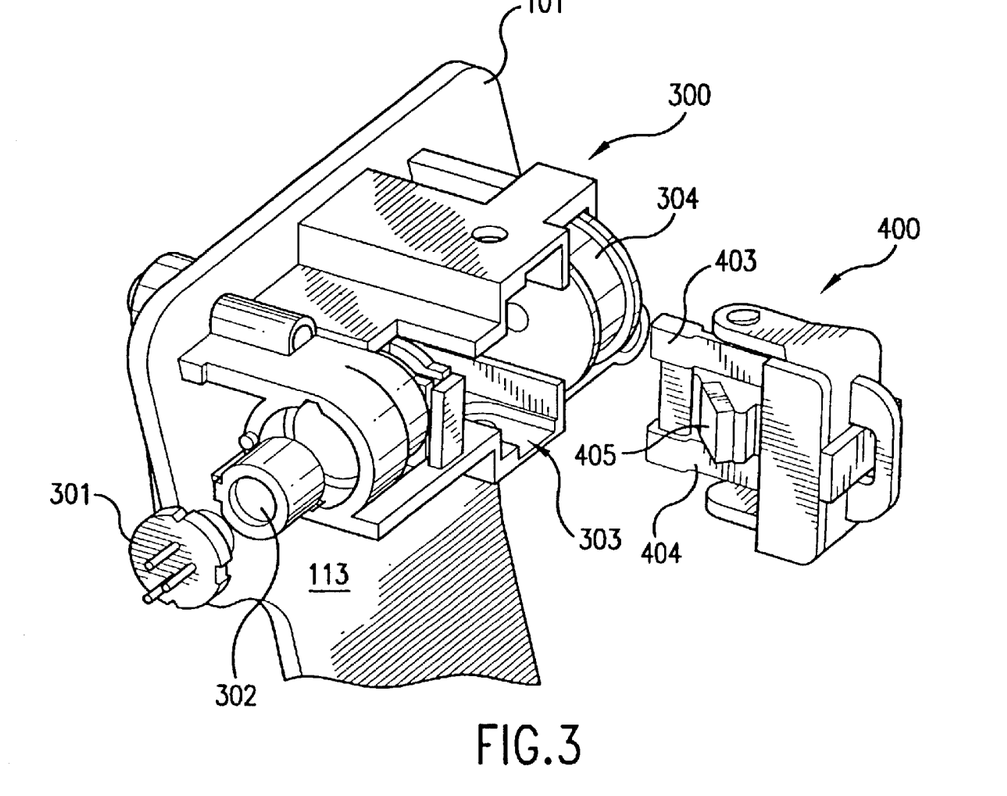
FIG. 3 is an enlarged, broken-away, exploded view of the light scanning assembly of the reader of FIG. 1.

FIG. 3 is a partially exploded view of the scanning assembly 300. The scanning assembly includes a laser/motor chassis which is a die cast part allowing the laser to be heat sunk. A laser 301 and a lens 302 are shown exploded to the left. The lens 302 may be a molded design similar to a molded plastic anamorphic lens or a glass lens with a separate injection molded cylindrical connector. To the right is a liquid silicone injection (LSI) molded assembly 400. This assembly 400 slides into a slot 303 in the chassis and snaps in place. Plus or minus five degrees mechanical adjustment is allowable during alignment to get the laser beam in the right location horizontally. The assembly 400 is then bonded in place. The chassis provides containment for shock protection but an additional part has been added to limit movement during a shock event.

An electromagnetic drive coil 304 is trapped in place by the chassis when it is secured to the PCB 101 with the screws 117 from the collection chassis 116. The coil 304 generates an alternating electromagnetic field which interacts with a permanent magnetic field generated by a magnet (not illustrated) on the assembly 400. A generally planar, scan mirror 405 is connected to the magnet and jointly moves therewith upon energization of the coil 304.

In operation, the laser beam emitted by the laser 301 and focused by lens 302 is incident on the scan mirror 405 which reflects the beam incident thereon forwardly through the slot 114 in the PCB and out through the housing along the plane 103 to the indicia to be read. Light scattered off the indicia is collected by the collection assembly 120 and processed into data related to the indicia.

Figure 4A:
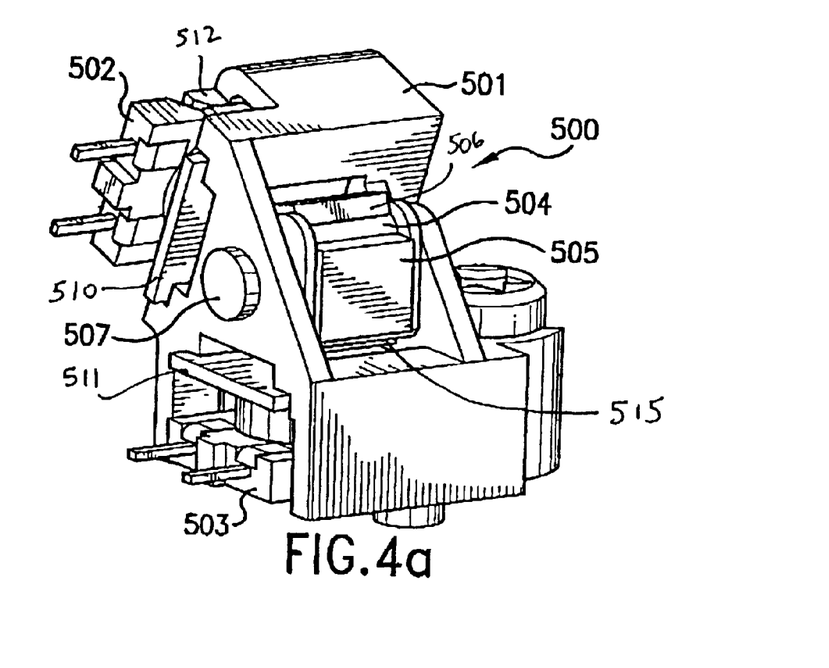
FIGS. 4a and 4b are perspective views of the assembled scan module in two respective modes of use.
Figure 4B:
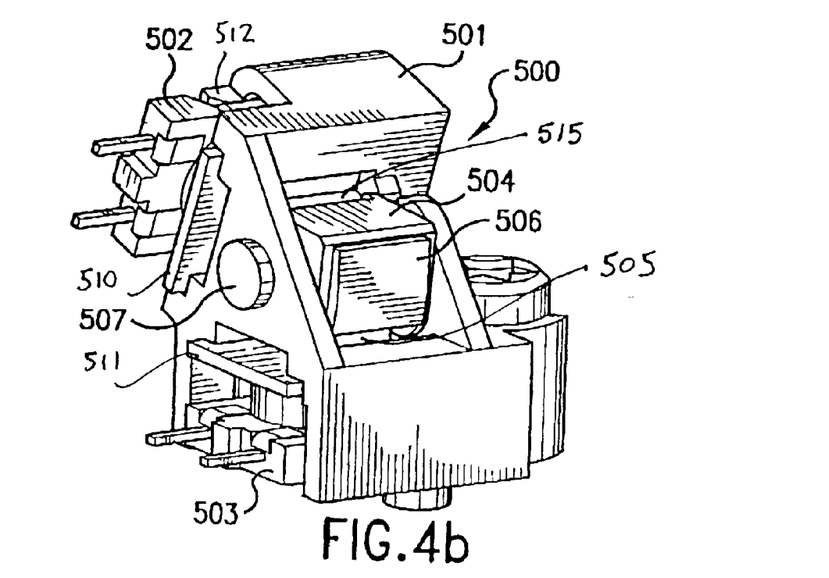
Figure 5A:
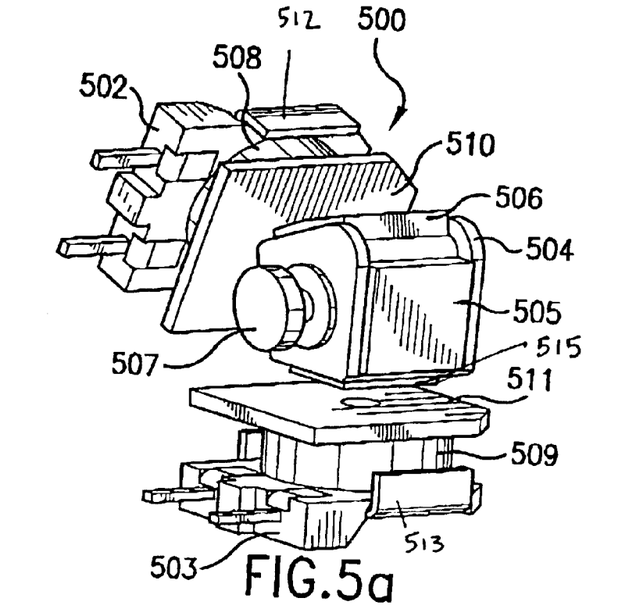
FIGS. 5a and 5b are perspective, exploded views of the scan module of FIGS. 4a and 4b, respectively.
Figure 5B:
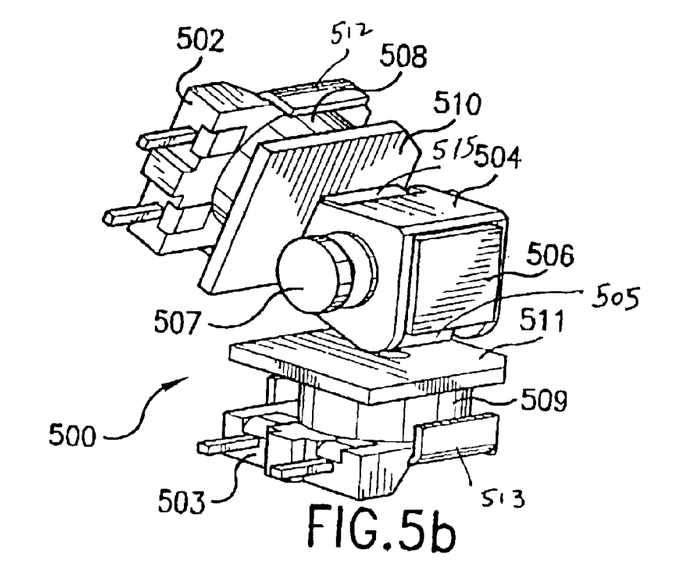

According to the present invention, the assemblies 300, 400 and the drive coil 304 are replaced by a scan module 500 depicted in assembled views in two different modes of operation in FIGS. 4a, 4b, and in exploded views in FIGS. 5a, 5b. Scan module 500 includes a support or housing 501. A first electromagnetic drive coil 502 and a second electromagnetic drive coil 503 are angularly offset about an axis extending lengthwise of a shaft 507 which extends through and is supported by the housing.

A hub 504 is mounted on the shaft 507 for turning movement relative to the housing. A first optical element, for example, a first scan mirror 505 having a generally planar outer surface is mounted on the hub for joint turning movement therewith. A second optical element, for example, a second scan mirror 506 having a generally convex outer surface, is also mounted on the hub for joint movement therewith. A permanent magnet 515 is also mounted on the hub for joint movement therewith. The magnet and the scan mirrors are angularly spaced apart about the axis of the shaft 507.

The first drive coil 502 includes a cylindrical casing 508 mounted on a circuit board 510 which is slid into a channel on the housing. The second drive coil 503 includes a cylindrical casing 509 mounted on a circuit board 511 which is slid into another channel on the housing. A first pole piece 512 is mounted on the first coil 502. A second pole piece 513 is mounted on the second coil 503. The pole pieces are constituted of ferromagnetic material. The housing 501 was eliminated from FIGS. 5a, 5b for a clearer view of the interior components.

In operation, a de pulse is applied to the input leads of one of the coils, for example, the first coil 502. The first coil generates a magnetic field which interacts with the permanent field of the magnet 515 to attract the magnet and to turn the hub until the magnet 515 faces the first pole piece 512, as depicted in a first operational mode in FIGS. 4b, 5b.

In this first operational mode, the second mirror 506 is positioned in a starting or reference position and faces an open side of the housing. A light beam, such as a laser beam from the laser diode 301, directed to the second mirror 506 is reflected toward indicia to be electro-optically read.

Thereupon, a periodic signal is applied to the input leads of the first coil 502. This creates an alternating magnetic field which interacts with the permanent field of the magnet 515 to oscillate the magnet and, in turn, the hub 504 and the second mirror 506 in alternate circumferential directions about the axis of the shaft 507. The second mirror 506 moves back-and-forth in opposite directions relative to the reference position, thereby causing the light beam reflected off the second mirror 506 to repetitively sweep scan lines across the indicia.

Once the indicia has been successfully read, or after a predetermined time period in which the indicia has not been successfully read, the periodic signal is discontinued, and the first coil is de-energized.

Rather than using the second mirror 506 to reflect the light beam to the indicia, the first mirror 505 can be positioned to face the open side of the housing in a second mode of operation as depicted in FIGS. 4a, 5a. In the second mode, a dc pulse is applied to the input leads of the second coil 503 which creates a magnetic field which interacts with the permanent field of the magnet to attract the magnet 515 until the magnet faces the second pole piece 513. The first mirror 505 is now positioned in the reference position at the open side of the housing.

Thereupon, a periodic signal applied to the second coil 503 creates an alternating magnetic field which interacts with the permanent field of the magnet to oscillate the magnet, the hub and the first mirror 505 in alternate circumferential directions about the axis of the shaft. The first mirror 505 is oscillated back-and-forth in opposite directions relative to the reference position to repetitively sweep scan lines across the indicia.

In both modes of operation, the mirrors 505, 506 are initially respectively positioned in the reference position by the pole pieces 513, 512 which act in a manner similar to restoring springs to precisely position the mirrors in their correct starting positions about which they oscillate. The pole pieces concentrate the magnetic field of the magnet. Alternatively, or in addition to pole pieces, physical stops could be used.

The mirrors 505, 506 have different optical properties. After passing through a circular aperture, the laser beam impinging on the mirrors typically has a generally circular cross-section. Reflection off the mirror 505 which has a flat outer surface does not change the cross-section of the beam and, hence, the positioning of the mirror 505 at the open side of the housing can be advantageously used for scanning two-dimensional symbols. Reflection off the mirror 506 which has a curved outer surface causes the beam cross-section to be elliptical and, hence, the positioning of mirror 506 is useful for scanning one-dimensional symbols. Other mirror shapes, such as concave, or cylindrical, or a combination of flat and curved surfaces, can also be employed. Thus, different beam spot shapes can be selected.

The energization of the drive coils can be initiated by activation of the trigger 106 by depressing the trigger to different positions, or by depressing the trigger a different number of times, or by actuation of a separate actuator switch, or even automatically by software control in which one coil, and then the other, is automatically energized until the symbol has been read, or after a predetermined time-out period has elapsed.

The scan module 500 can be used in a reader as the only scan component to sweep a scan pattern extending in one direction. The scan module 500 can be teamed with an identical scan module 500 in a reader to sweep a scan pattern extending over two directions.

In the preferred embodiment, the scan module 500 is teamed with another, but not an identical, scan engine for generating a scan pattern extending over two directions. A conventional scan engine is used for generating an X-axis sweep, while the scan module 500 of this invention is used for generating a Y-axis sweep. The Y-axis sweep over the height of the indicia does not require as wide an arc over which the scan mirror is oscillated. The scan module 500 typically oscillates the scan mirror over an arc of ±3° mechanical. The scan module oscillates at a rate on the order of 100 scans per second and can switch operational modes every 20 milliseconds.

The scan module 500 is a compact engine for creating a rastering scan pattern on indicia to be read. The module is easily replaceable in a reader in the field for maintenance purposes.

In a variant construction, the two coils and the single magnet can be replaced by a single electromagnetic coil and two permanent magnets on the hub. Also, rather than mirrors mounted on the hub, other optical elements, such as prisms or focusing lenses, could be selectively positioned in different operational modes. Still another variation resides in reflecting not the light from a light source, but instead, in reflecting the light reflected or scattered off the indicia to a photodetector. In this case, it is not the laser beam which is swept, but the field of view of the photodetector.

It will be understood that each of the features described above, or two or more together, may find a useful application in other types of scanners and bar code readers differing from the types described above.

While the invention has been illustrated and described as embodied in a compact scan module in bar code readers, it is not intended to be limited to the details shown, since various modifications and structural changes may be made without departing in any way from the spirit and scope of the present invention. In particular it will be recognized that features described in relation to one embodiment can be incorporated into other embodiments as appropriate in a manner that will be apparent to the skilled reader.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by letters patent is set forth in the appended claims:

We claim:

1. An arrangement for scanning indicia in a system for electro-optically reading the indicia, the arrangement comprising:

a) a support;
   b) a hub mounted on the support for turning movement about an axis;
   c) a plurality of optical elements mounted on the hub for joint movement therewith, and having different optical characteristics for differently optically modifying light incident on a respective element, and for directing the differently optically modified light along an optical path toward the indicia to be read; and d) a drive for selectively positioning one of the elements at a reference position in the optical path, and for oscillating said one of the elements about the axis to scan the indicia with the differently optically modified light.

2. The arrangement of claim 1, wherein the optical elements are mirrors.

3. The arrangement of claim 2, wherein one of the mirrors has a substantially planar reflecting surface, and another of the mirrors has a curved reflecting surface.

4. The arrangement of claim 1, wherein the drive includes a permanent magnet on the hub for generating a permanent magnetic field, a first electromagnetic coil for generating a first magnetic field that interacts with the permanent field to turn the hub, and a first pole piece for attracting the permanent field of the magnet to position said one of the elements at the reference position.

5. The arrangement of claim 4, wherein the optical elements are angularly spaced apart about the axis, and wherein the drive includes a second electromagnetic coil for generating a second magnetic field that interacts with the permanent field to turn the hub, and a second pole piece angularly spaced apart from the first pole piece for attracting the permanent field of the magnet to position another of the elements about the reference position.

6. The arrangement of claim 1, wherein the drive includes a permanent magnet on the hub for generating a permanent magnetic field, and a plurality of electromagnetic coils for respectively generating alternating magnetic fields that respectively interact with the permanent field to oscillate said one of the elements in the reference position.

7. The arrangement of claim 1, wherein the drive includes a permanent magnet, and wherein the elements are mirrors, and wherein the mirrors and the magnet are angularly spaced apart about the axis on the hub.

8. The arrangement of claim 1, wherein the drive is operative for repetitively oscillating said one of the elements in opposite circumferential directions about the axis a plurality of times per second.

9. The arrangement of claim 1, wherein the optical characteristics of one of the elements modifies a cross-section of the light incident therein.

10. The arrangement of claim 1, wherein the drive is manually activated.

11. The arrangement of claim 1, wherein the drive is automatically activated.

12. The arrangement of claim 1, wherein the drive, the hub and the support constitute a scan module replaceably mountable as a unit in the system.

13. The arrangement of claim 1, and further comprising a light source for emitting a light beam at said one of the elements.

14. The arrangement of claim 13, and further comprising means for sweeping the light beam along a first scan direction, and wherein the light incident on said one of the elements is the light beam being swept along the first scan direction.

* * * * *

UNITED STATES PATENT AND TRADEMARK OFFICE
CERTIFICATE OF CORRECTION

PATENT NO. : 6,722,566 B1
DATED : April 20, 2004
INVENTOR(S) : Drzymala et al.

It is certified that error appears in the above-identified patent and that said Letters Patent is hereby corrected as shown below:

<u>Title page,</u>
Item [75], Inventors, please correct "Drzymak" to -- Drzymala --

Signed and Sealed this

Ninth Day of November, 2004

JON W. DUDAS
*Director of the United States Patent and Trademark Office*